United States Patent [19]

Matsui et al.

[11] Patent Number: 5,835,890
[45] Date of Patent: Nov. 10, 1998

[54] METHOD FOR SPEAKER ADAPTATION OF SPEECH MODELS RECOGNITION SCHEME USING THE METHOD AND RECORDING MEDIUM HAVING THE SPEECH RECOGNITION METHOD RECORDED THEREON

[75] Inventors: Tomoko Matsui; Sadaoki Furui, both of Tokyo, Japan

[73] Assignee: Nippon Telegraph and Telephone Corporation, Tokyo, Japan

[21] Appl. No.: 835,421

[22] Filed: Apr. 9, 1997

[30] Foreign Application Priority Data

Aug. 2, 1996 [JP] Japan ................................. 8-204519

[51] Int. Cl.$^6$ .................................................. G10L 7/08
[52] U.S. Cl. .................................... 704/255; 704/256
[58] Field of Search .................................. 704/231, 256, 704/200, 232, 236, 240, 245, 241, 243, 244, 255, 257, 242; 702/239

[56] References Cited

U.S. PATENT DOCUMENTS

| | | | |
|---|---|---|---|
| 4,783,804 | 11/1988 | Juang et al. | 704/245 |
| 4,829,577 | 5/1989 | Kuroda et al. | 704/244 |
| 5,023,912 | 6/1991 | Segawa | 704/240 |
| 5,046,099 | 9/1991 | Nishimura | 704/256 |
| 5,050,215 | 9/1991 | Nishimura | 704/256 |
| 5,233,681 | 8/1993 | Bahl et al. | 704/200 |
| 5,278,942 | 1/1994 | Bahl et al. | 704/200 |
| 5,289,562 | 2/1994 | Mitzuta et al. | 704/200 |
| 5,293,584 | 3/1994 | Brown et al. | 704/277 |
| 5,465,317 | 11/1995 | Epstein | 704/236 |
| 5,497,447 | 3/1996 | Bahl et al. | 704/245 |
| 5,502,791 | 3/1996 | Nishimura et al. | 704/256 |
| 5,579,436 | 11/1996 | Chou et al. | 704/244 |
| 5,621,859 | 4/1997 | Schwartz et al. | 704/256 |
| 5,715,367 | 2/1998 | Gillick et al. | 704/254 |
| 5,737,489 | 4/1998 | Chou et al. | 704/256 |

OTHER PUBLICATIONS

Matsui, Tomoko, et al., "N–Best Based Unsupervised Speaker Adaptation," *IEICE Technical Report*, vol. 96, No. 449, Jan. 17, 1997, pp. 1–8.

*Primary Examiner*—Richemond Dorvil
*Attorney, Agent, or Firm*—Pollock, Vande Sande & Priddy

[57] ABSTRACT

In a speaker adaptation method for speech models, input speech is transformed to a feature parameter sequence like a cepstral sequence, and N model sequences of maximum likelihood for the feature parameter sequence are extracted from speaker-independent speech HMMs by an N-best hypothesis extraction method. The extracted model sequences are each provisionally adapted to maximize its likelihood for the feature parameter sequence of the input speech while changing the HMM parameters of each sequence, and that one of the provisionally adapted model sequences which has the maximum likelihood for the feature parameter sequence of the input speech is selected and speech models of the selected sequence are provided as adapted HMMs of the speaker to be recognized.

20 Claims, 4 Drawing Sheets

| EXTRACTED MODEL SEQ | | MAX LIKELIHOOD FUNCTION |
|---|---|---|
| $\Lambda_1 = \lambda_{11} \lambda_{12} \cdots \lambda_{1k1}$ | : | $f(X|\Lambda_1, Q_1)$ |
| $\Lambda_2 = \lambda_{21} \lambda_{22} \cdots \lambda_{2k2}$ | : | $f(X|\Lambda_2, Q_2)$ |
| $\vdots$ | | $\vdots$ |
| $\Lambda_N = \lambda_{N1} \lambda_N \cdots \lambda_{NkN}$ | : | $f(X|\Lambda_N, Q_N)$ |

| BASELINE | PRIOR ART | PRESENT INVENTION |
|----------|-----------|-------------------|
| 84.5 %   | 85.0 %    | 88.0 %            |

METHOD FOR SPEAKER ADAPTATION OF SPEECH MODELS RECOGNITION SCHEME USING THE METHOD AND RECORDING MEDIUM HAVING THE SPEECH RECOGNITION METHOD RECORDED THEREON

BACKGROUND OF THE INVENTION

The present invention relates to a method for speaker adaptation of speech models by which speaker-independent speech models, obtained by modeling speech features corresponding to phonemes, words or similar recognition categories in speech of many speakers through the use of a Hidden Markov Model (HMM) scheme, are adapted to each speaker so as to increase the rate of recognition of the speaker. The invention also pertains to a speech recognition method using the speaker adaptation method and a recording medium having the speech recognition method recorded thereon.

In speech recognition, a feature parameter sequence of input speech is compared with reference speech (word or phoneme) model sequences prepared in advance and the most likely one of them is output as a recognition result. A reference model dictionary for speech recognition, which is a set of such reference speech models, is set up as described below, for instance. Speech sounds of a number of speakers are analyzed using LPC (Linear Predictive Coding) to obtain feature parameter sequences, from which reference word or phoneme models (hereinafter referred to generically as speech models) are derived for each word or phoneme to form a reference model dictionary.

A brief description will be given first, with reference to FIG. 1, of the HMM since it is general practice in the recent speech recognition technology to use, as the reference speech model, the HMM that represents speech, for example, by a statistic of such a feature parameter sequence like a cepstral sequence which is obtained every fixed length frame.

For instance, in the phoneme HMM a feature parameter sequence corresponding to each phoneme usually contains somewhat different features in start, intermediate and end regions of the phoneme; hence, the feature parameter sequence can be defined by three states representing these three regions as depicted in FIG. 1A. Since the speech phenomenon is continuous, however, the regions are not definitely demarcated, but in FIG. 1A their boundaries are clearly shown for the sake of brevity. These regions will hereinafter are called first, second and third regions and indicated by $S_1$, $S_2$ and $S_3$, respectively.

Each state of the phoneme HMM represents the distribution of the feature parameters in each region of the phoneme and, in practice, it is expressed by a combination of Gaussian distributions in the dimension of the feature parameter vector. FIG. 1B shows an example which expresses each state by a combination of four Gaussian distributions when the feature parameter vectors are one-dimensional. In this instance, the state $S_i$ is defined by mean value $m_i = \{m_{i1}, m_{i2}, m_{i3}, m_{i4}\}$, variance $\sigma_i = \{\sigma_{i1}, \sigma_{i2}, \sigma_{i3}, \sigma_{i4}\}$ and weighting factor $w_i = \{w_{i1}, w_{i2}, w_{i3}, w_{i4}\}$ of the four Gaussian distributions. Such a distribution, expressed by a combination of a plurality of Gaussian distributions, is called a mixed Gaussian distribution.

Further, probabilities $a_{11}$, $a_{22}$ and $a_{33}$ of transition of the first, second and third states $S_1$, $S_2$ and $S_3$ to the same state and probabilities $a_{12}$ and $a_{23}$ of their transition to the next states are defined as shown in FIG. 1C, for instance. A set of statistical parameters consisting of the mean values, variances, weighting factors and state transition probabilities of the mixed Gaussian distributions of the three states is called HMM model parameters representing this phoneme, and they will hereinafter be identified by θ. In the reference model dictionary there have been stored speech HMM parameters for all of predetermined phonemes (or words).

In speech recognition, the feature parameter sequence derived from input speech is applied to all possible speech HMM sequences and that one of them which is higher in probability than any others is output as a recognition result. Incidentally, this probability is referred to as HMM likelihood and, in practice, it is given as the product of a probability calculated from the mixed Gaussian distribution and the state transition probability in the case where the feature parameter sequence is assigned probabilistically to each state contained in the speech HMM sequence. For the adaptation of a speech model to speaker-independent speech described later, the model parameters θ (the mean values $m_1$, $m_2$ and $m_3$ of the mixed Gaussian distributions in the three states, for instance) of each speech HMM are varied in such a manner as to maximize the likelihood of the speech model sequence corresponding to the speech of that speaker.

For example, an interactive automatic ticket vending machine that utilizes speech recognition techniques is a required to recognize the name of a station uttered by an unspecified user and issue a ticket for the designated station. It is considered that the speaker-independent speech recognition rate could be increased by adapting the reference model dictionary to the user through utilization of his uttered speech and re-recognizing the speech by the use of the adapted reference model dictionary.

In general, the speaker adaptation technique can be considered separately for supervised adaptation and unsupervised adaptation, depending on whether uttered contents of speech data for adaptation are known or unknown. Further, this technique can be classified into an off-line type in which the recognition system collects an appropriate amount of speech data in advance and uses it for adaptation and an on-line type that uses each speaker's utterance for an unsupervised adaptation. The unsupervised on-line type speaker adaptation is called an instantaneous speaker adaptation, which is particularly effective in an application where an unspecified number of users utilize the recognition system one after another as in the case of the above-mentioned ticket vending machine. However, the instantaneous speaker adaptation must be done on an unsupervised basis using only a small amount of speech data.

In conventional unsupervised speaker adaptation, input speech is once recognized using a speaker-independent reference model dictionary (a set of reference phoneme HMMs, for instance) on the basis of a decoding algorithm like the Viterbi algorithm as disclosed in, for example, Seiich Nakagawa, "Speech Recognition Using Probability Models," Institute of Electronics, Information and Communication Engineers of Japan, 1988, after which the phoneme HMM sequence of the input speech is estimated. The phoneme HMM sequence A of the input speech is estimated by selecting phoneme HMMs from the reference model dictionary, which are concatenated together. In order to maximize the likelihood of the concatenated phoneme HMM sequence, a transformation parameter η in a function (a model transformation function) $G_\eta(\theta)$ for mapping model parameters θ of all phoneme HMMs of the reference model dictionary to the phoneme model parameters of the speaker to be recognized is calculated by the following equation:

$$\eta' = \underset{\eta}{\arg\max}\, f(X|\Lambda, \eta, \theta)g(\theta) \quad (1)$$

based on, for example, a Maximum A Posteriori (MAP) estimation (J. L. Gauvain and C. -H. Lee, Maximum a posteriori estimation for multivariate Gaussian mixture observations of Markov chains, IEEE Trans. Speech and Audio processing, vol. 2, No. 2, pp. 291–298, for instance), where X is input speech, f() a likelihood function and g() a priori probability density function. Parameters θ' of the phoneme HMM adapted to the speaker to be recognized are calculated by the following equation (2) using the θ'.

$$\theta' = G_{\theta'}(\theta) \quad (2)$$

In practice, it is assumed that the variance σ, weighting factor w and state transition probability which form the model parameters representing each phoneme model do not vary, and only the mean value m is adapted. In this instance, the model transformation function $G_\theta()$ is calculated by the following equation (3):

$$G_\theta(m) = m + \theta \quad (3)$$

In this way, the input speech X is re-recognized using the reference model dictionary adapted to the speaker to be recognized and the recognition result is output. With the mapping of the model parameters θ by Eqs. (1) and (2), however, the phoneme HMM sequence cannot accurately be estimated for the input speech X of speakers for which the speaker-independent reference phoneme HMM dictionary is low in recognition rate, and hence the intended effect of speaker adaptation is not always produced.

SUMMARY OF THE INVENTION

It is therefore an object of the present invention to provide a method for speaker adaptation of speech models which permits more accurate estimation of a speech model sequence for input speech through speaker adaptation.

Another object of the present invention is to provide a speech recognition method which has a high success rate in recognition through utilization of the speaker adaptation method.

Still another object of the present invention is to provide a recording medium which has the speech recognition method recorded thereon.

The speaker adaptation method according to the present invention comprises a feature parameter extracting step, a model sequence extracting step, a provisional adaptation step, and an adapted model selecting step. In the feature extracting step, input speech of a speaker to be recognized has a feature parameter sequence extracted therefrom. In the model sequence extracting step, a plurality of hypotheses of a model sequence estimated to correspond to the feature parameter sequence of the input speech are extracted using the extracted feature parameter sequence and speaker-independent speech models. In the provisional adaptation step, concatenated speaker-independent speech models of each of the plurality of extracted model sequences are adapted to maximize their likelihoods for the feature parameter sequence of the input speech. In the adapted model selecting step, the likelihoods of the adapted speech models of each model sequence for the feature parameter sequence are calculated and, based on the calculated likelihoods, one of the model sequences is selected and the speech models of the selected model sequence are provided as adapted speech models.

In the adapted model selecting step, the adapted speech models are selected based on the likelihoods calculated using the speech models after the speaker adaptation, not on the likelihoods calculated using the speaker-independent speech models. This is based on the principle that, even if the likelihoods of speaker-independent speech models for a correct model sequence are low, the likelihoods of the speech models are high after speaker adaptation. According to the present invention, a plurality of model sequences are extracted so that the correct model sequence may be included with a high probability, then these model sequences are subjected to speaker adaptation, and the adapted speech models are compared in terms of the likelihood for the speech to be recognized. By selecting the speech model of the maximum likelihood, the adaptation is carried out based on a more correct model sequence.

For the extraction of a plurality of model sequences in the model sequence extracting step, it is possible to use the N-best paradigm of multiple-pass search strategies disclosed, for example, in C. -H. Lee et al supervised, "Automatic speech and speaker recognition (Chapter 18: Multi-pass search strategies," Kluwer Academic Publishers, 1995. This permits effective reduction of the model sequence search space. More specifically, speech of the speaker to be recognized is used for the adaptation of speaker-independent speech model parameters to increase their likelihoods for the speech of the speaker to be recognized, while at the same time the hypotheses (model sequences) for adaptation are re-selected from N-best hypotheses. By this, the adaptation of speech models to the speaker to be recognized is done.

In the present invention, the adaptation of speech models of each model sequence is performed roughly first with the parameters tightly tied together, then the roughly adapted speech models of each model sequence are adapted using the speech of the speaker to be recognized, and that one of the adapted speech models which has the maximum likelihood for the speech of the speaker to be recognized is selected as the adapted speech model. In this instance, each model sequence is adapted finely with the ties of parameters loosened more than in the previous adaptation. It is also possible to use, for the adaptation of the speech models, model parameters obtained by averaging model parameters of N model sequences with weights corresponding to their likelihoods, in place of using the model parameters of the model sequence of the maximum likelihood selected in the adapted model selecting step. The above procedure is repeated at least once. The repetition may be limited specifically to the provisional adaptation step and the adapted model selecting step. That is, the plurality of initially extracted model sequences can be re-used without returning to the model sequence extracting step.

As the recognition result, the model sequence of the maximum likelihood ultimately selected in the adapted model selecting step is provided. Alternatively, the input speech is re-recognized using adapted speech models corresponding to the model sequence selected in the adapted model selecting step and the model sequence of the maximum likelihood is output as the recognition result.

The recognition method using the adaptation algorithm according to the present invention is prerecorded on a recording medium. The recording medium can be used in various speaker-independent speech recognition systems.

DESCRIPTION OF THE PREFERRED EMBODIMENTS

First Embodiment

Figure 1:
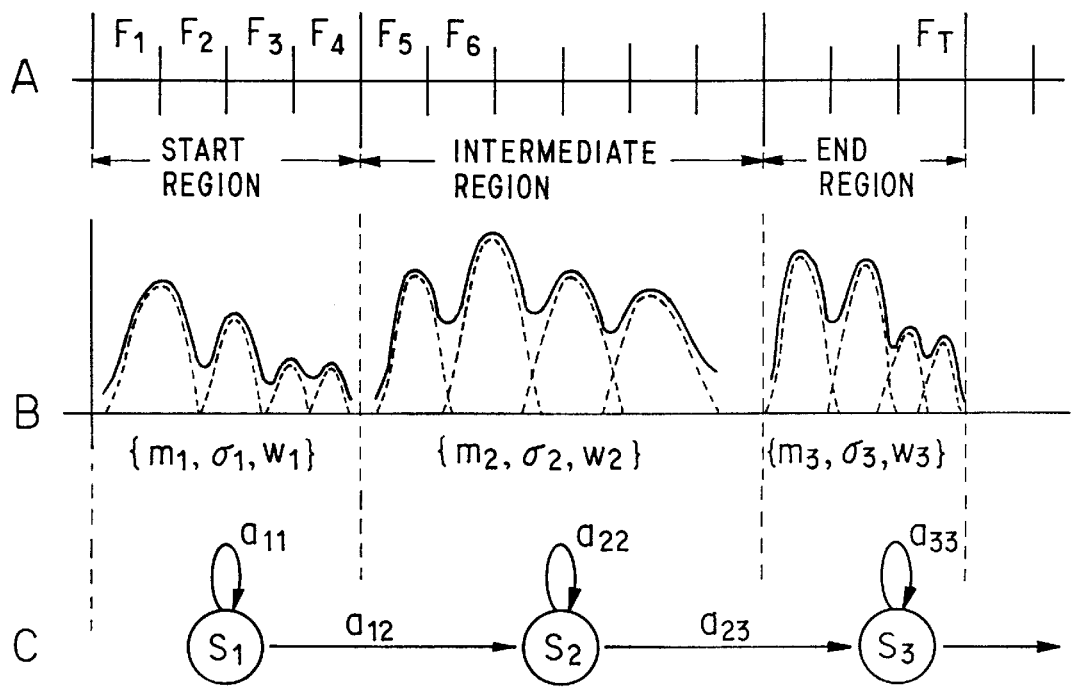
FIG. 1 is a diagram for explaining the HMM.

A first embodiment of the present invention will be described below with reference to FIGS. 2 and 3. A speech model storage part 12 is used to prestore, as a reference model dictionary, speaker-independent speech models, for example, speaker-independent speech HMMs that correspond to recognition categories of words or the like based on speech of many speakers. The procedure for the speech recognition method, which utilizes the speaker adaptation method of the present invention, is prerecorded in a memory 10M in a control part 10, and the control part 10 follows the prerecorded procedure to control processing of respective parts 11 through 16 of the speech recognition system of FIG. 3.

Step S1 (Feature Parameter Extracting Step): Feature parameters of speech data of the speaker to be recognized are extracted in the feature parameter extracting part 11. In this step input speech data is LPC analyzed every fixed length frame to obtain, as a feature parameter sequence, time sequences of feature parameter vectors such as cepstral sequences or delta cepstral sequences.

Step S2 (Model Sequence Extracting Step): In the model sequence selecting part 13, speech models selected from the speech model storage part 12 are concatenated, and the resulting model sequences are compared with the feature parameter sequence of the input speech, followed by extracting N model sequences $\Lambda_1, \Lambda_2, \ldots, \Lambda_N$ that are estimated to be closest to the speech data X transformed to the feature parameter sequence in step Si. This extraction of the model sequences is based on the scheme disclosed, for example, in W. Chou et al, "An algorithm of high resolution and efficient multiple sequence hypothesization for continuous speech recognition using inter-word models," Proc. ICASSP, pp.II-153–156, 1994.

More specifically, the likelihoods $f(X|\Lambda, \theta)$ of all possible speech HMM sequences $\Lambda$ for the speech data X transformed to the above-mentioned feature parameter sequence is calculated in the likelihood calculating part 14 and N (a predetermined integer equal to or greater than 2) model sequences $\Lambda_n$ (n=1, ..., N) are selectively extracted from the model sequence selecting part 13 in a descending order of likelihood. The number N is chosen such that a model sequence correctly representing the speech to be recognized (a correct solution) may be included in the extracted N model sequences with a high probability. For example, when N=10 in the case of a four-digit number speech (word sequence), a probability of the correct model sequence being included in 10 model sequences is around 97%. An increase in the number N will causes an increase in the probability of the correct model sequence being included in such candidate model sequences; hence, the number N may preferably be large if the computational load and the processing time are not taken into account. The number N needs to be increased according as the speech to be recognized becomes complex. In the present invention it is of importance that the correct solution is included in the N extracted model sequences with a high probability.

Step S3 (Provisional Adaptation Step): In the adaptation part 15 a transformation parameter $\eta'_n$ is calculated, by the following equation:

$$\eta'_n = \underset{\eta_n}{\arg\max}\, f(X|L_n, \eta_n, \theta) g(\theta) \qquad (4)$$

for each model sequence $\Lambda_n$ (n=1, ..., N) extracted in step $S_2$ so as to maximize the likelihood function $f(X|\Lambda_n, \eta_n, \theta)$. The thus calculated transformation parameter $\eta'_n$ is used to transform the model parameters $\theta$ of the speaker-independent speech HMMs forming the model sequence $\Lambda_n$ to obtain $\theta'_n(=G_{\eta'_n}(\theta))$. This can be done using, for example, a Baum-Welch algorithm (Seiich Nakagawa, "Speech Recognition Using Probability Model," Institute of electronics, Information and Communication Engineers of Japan, 1988), for instance, or the MAP estimation algorithm. The transformation to the model parameters $\theta'_n$ by the use of the transformation parameter $\eta'_n$ means that all speech HMMs forming each of the N model sequences $\Lambda_n$ (N=1, ..., N) have been provisionally adapted to the speaker to be recognized.

Figures 3, 4:
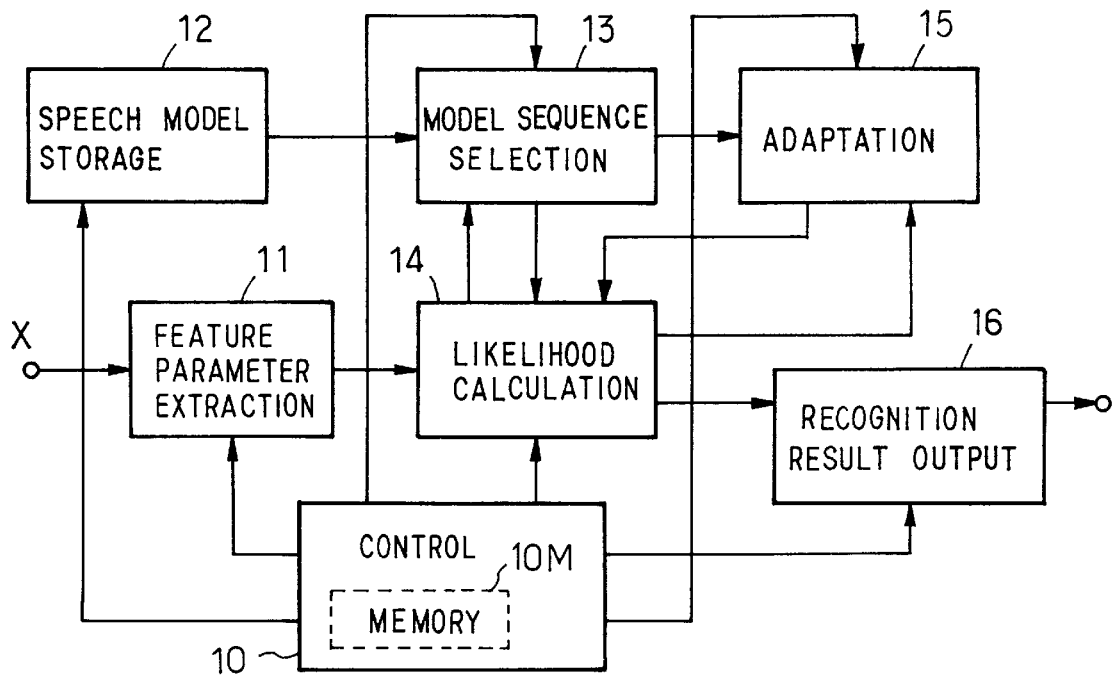
FIG. 3 is a functional block diagram of a speech recognition system for carrying out the present invention.
FIG. 4 is a table showing extracted model sequences obtained in step $S_2$ of the FIG. 2 flowchart and the corresponding likelihood functions.

That is, let it be assumed that the model sequences $\Lambda_1, \Lambda_2, \ldots, \Lambda_N$ are composed of speech models $\lambda_{11}, \lambda_{12}, \ldots, \lambda_{1K1}$, speech models $\lambda_{21}, \lambda_{22}, \ldots, \lambda_{2k2}, \ldots$, and speech models $\lambda_{N1}, \lambda_{N2}, \ldots, \lambda_{NKN}$, respectively, as shown in FIG. 4. The transformation parameter $\eta'_1$ is calculated, by Eq. (4), which maximizes the likelihood function $f(X|\Lambda_1, \eta_1, \theta_1)$ for the speech data of the model sequence $\Lambda_1$ when the transformation parameter $\eta_1$ was changed, and the thus obtained parameter $\eta'_1$ is used to transform the model parameters $\theta$ of the speaker-independent speech HMM to $\theta_1(=G\eta_1(\theta))$. Incidentally, in the determination of the transformation parameter $\eta_n$ in common to all the model parameters $\theta$ of all the speech models (HMMs) $\lambda_{n1}, \lambda_{n2}, \ldots, \lambda_{nkn}$ which form the model sequence $\Lambda_n$, the transformations of the parameters $\theta$ of the respective speech models are constrained by one another; in this case, the parameters are said to be tightly tied together.

Similarly, the transformation parameter $\eta_2$ for the speech models $\lambda_{21}, \lambda_{22}, \ldots, \lambda_{2k2}$ of the model sequence $\Lambda_2$ is changed to obtain a transformation parameter $\eta'_2$ which maximizes the likelihood function $f(X=\Lambda_2, \eta_2, \theta_2)$ of the model sequence $\Lambda_2$ for the speech data X, and a provisionally adapted model parameter $\theta_2(=G\eta_2(\theta))$ is derived from the transformation parameter $\eta'_2$. Thereafter, a transformation parameter $\eta'_n$ is similarly obtained which maximizes the likelihood function $f(X|\Lambda_n, \eta_n, \theta_n)$ of the model sequence $\Lambda_n$, and a provisionally adapted model parameter $\theta_n$ is obtained. In this way, N provisionally adapted speech model parameters $\theta_1, \ldots, \theta_N$ are obtained.

Step S4 (Adapted Model Selecting Step): Next, a calculation is made of the likelihood or likelihood function $f(X|\Lambda_n, \theta_n)$ of each model parameter $\theta_n$ provisionally adapted in step S3, and the model sequence $\Lambda_i$ which has the maximum one of the likelihood functions $f(X|\Lambda_1, \theta_1), \ldots, f(X|\Lambda_N, \theta_N)$ is selected as a correct model sequence. Accordingly, the speech HMMs forming the model sequence $\Lambda_i$ are those already adapted to the speaker.

Figure 2:
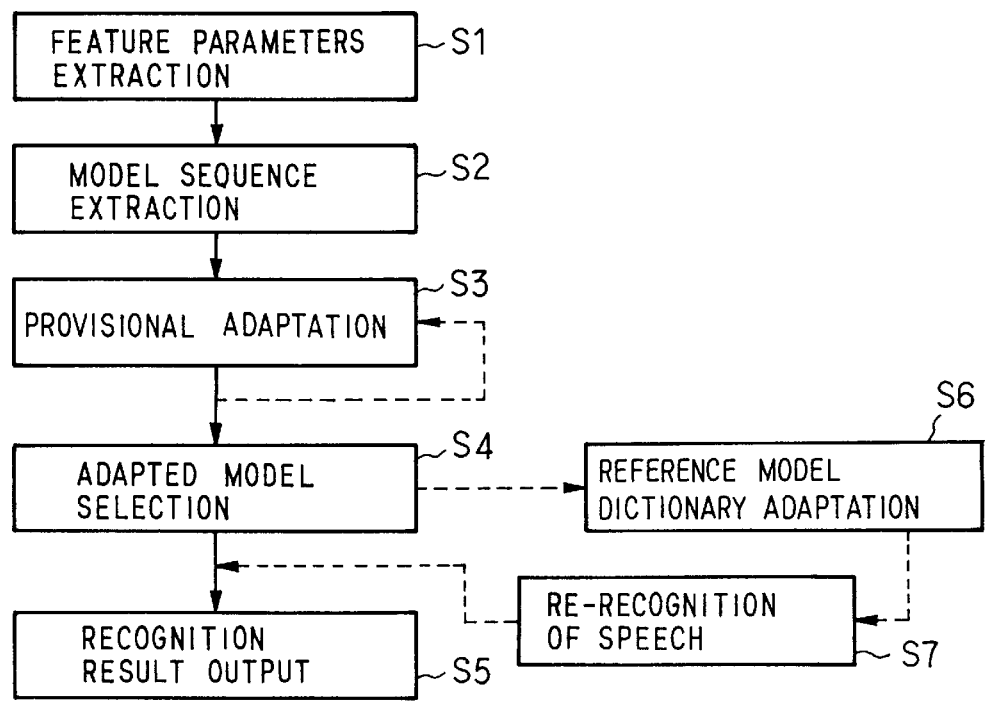
FIG. 2 is a flowchart showing the procedure of the method according to a first embodiment of the present invention.

As indicated by the broken line in FIG. 2, the provisional adaptation of step S3 may also be repeated a predetermined number of times in succession. In such an instance, the provisional adaptation of each model sequence by the transformation parameter $\eta'_n$ is made finely with the parameters tied together more loosely than in the immediately preceding provisional adaptation. That is, all model parameters θ of all speech models forming each model sequence $\Lambda_n$ are clustered into two groups and the model parameters of the two groups are independently controlled by transformation parameters $\eta_a$ and $\eta_b$ to maximize the likelihood. By this, the model sequence $\Lambda_n$ is provisionally adapted following Eqs. (2) and (3). In practice, a variation Δm (η=Δm) in the mean value m of the Gaussian distribution, for instance, is used as the transformation parameter T as described previously. In such a case, mean values of distributions contained in all the models forming each model sequence $\Lambda_n$ are clustered into two groups, and variations $\Delta m_a$ and $\Delta m_b$ in the mean values of the two groups are determined independently of each other. In this way, the N model sequences are provisionally adapted to maximize their likelihood for the input speech X.

In the speech recognition result output step S5, the model sequence $\Lambda_i$ of the maximum likelihood selected in step S4 is output. Alternatively, as indicated by the broken lines in FIG. 2, all speech models of the reference model dictionary are adapted in step S6 by the transformation parameter $\eta'_i$ used for the adapted model sequence $\Lambda_i$ ultimately selected in step S4, then in step S7 the input speech data X is re-recognized using the adapted reference model dictionary and the model sequence of the maximum likelihood is extracted, and the extracted model sequence is output as the recognition result in step S5. In this instance, a model sequence of the maximum likelihood function f(X|Λ,θ) for the input speech data X transformed into the feature parameter sequence is calculated by the Viterbi algorithm, for instance, and it is output as the recognition result.

Second Embodiment

Figure 5:
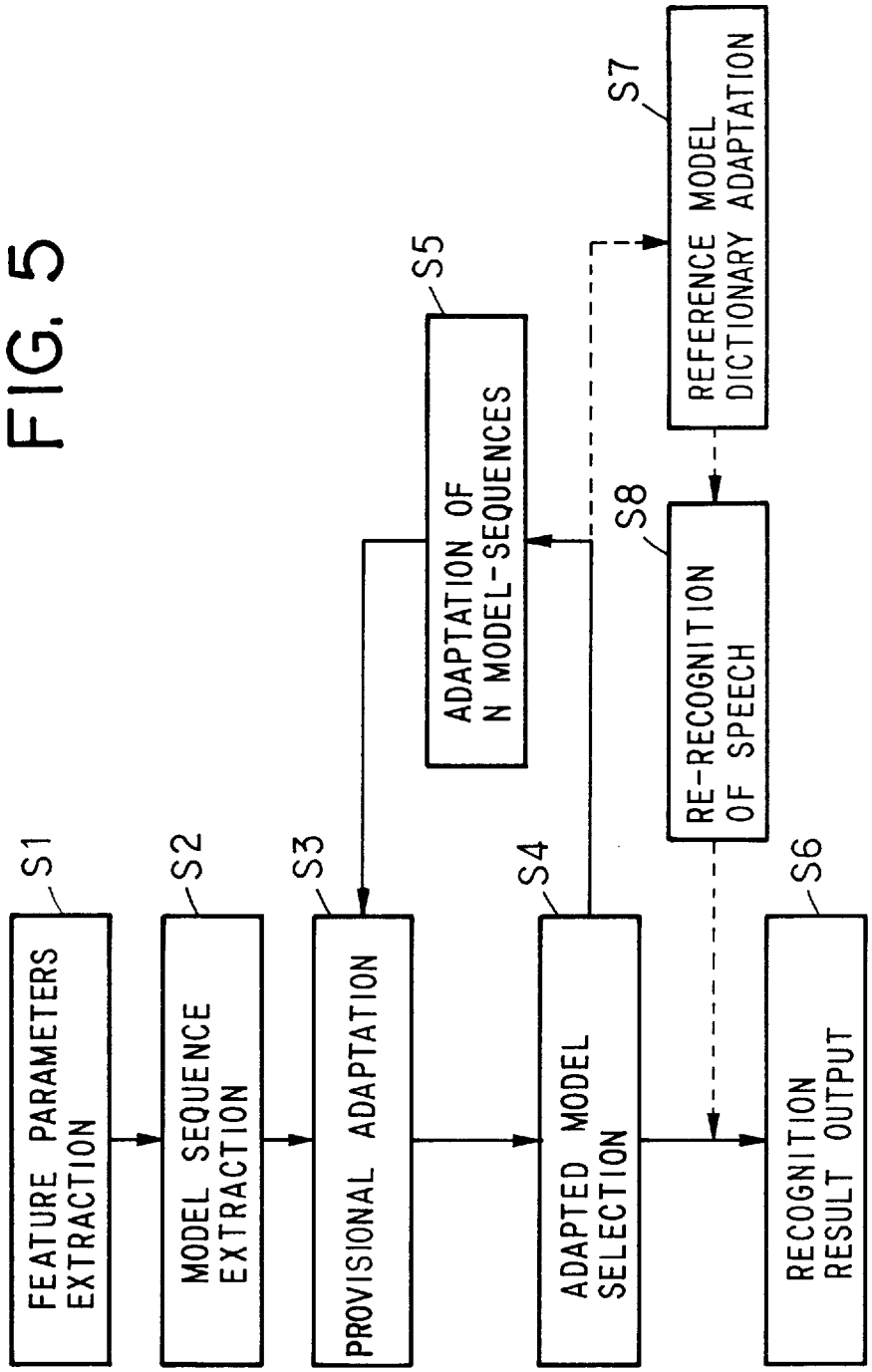
FIG. 5 is a flowchart showing the procedure of the method according to a second embodiment of the present invention.

FIG. 5 shows the procedure of a second embodiment of the speech model adaptation method according to the present invention. In this embodiment, the first four steps S1 through S4 are identical with those in FIG. 2 which shows the procedure of the first embodiment. In step S1 the input speech is LPC-analyzed for transformation into a feature parameter sequence. In step S2, N speech model sequences of great likelihoods for the input speech feature parameter sequence are selected from the reference model dictionary. In step S3 the N model sequences are each adapted in such a manner as to maximize their likelihood. In step S4 the model sequence of the maximum likelihood is selected from the N provisionally adapted model sequences. After the completion of step S4, the following processing is further carried out.

Step S5 (N-Model Adaptation Step): The adaptation of the N model sequences prior to the provisional adaptation in step S3 is performed using the transformation parameter $\eta'_i$ that maximized, in step S3, the likelihood of the model sequence $\Lambda_i$ selected in step S4.

This is followed by a return to step S3, in which the provisional adaptation of each of the N model sequences $\Lambda_1$ through $\Lambda_N$ subjected to adaptation previously in step S5 is performed so that the likelihood for the input speech data X is maximized. In this case, however, each provisional adaptation by the transformation parameter $\eta_n$ is carried out with the ties of the parameters in each model sequence loosened more than in the previous provisional adaptation.

In step S4 the model sequence of the maximum likelihood is selected again as a correct model sequence from the N model sequences.

In the second embodiment it is also possible to perform processing of steps S5, S3 and S4 repeatedly a desired number of times and select, as the correct model sequence, the model sequence of the maximum likelihood in step S4 in the last cycle.

In the second embodiment, the model sequence ultimately selected in step S4 is output as the recognition result from the recognition result output part 16 in step S6. Alternatively, as indicated by the broken lines, all the speech models of the reference model dictionary are subjected to adaptation in step S7 using the transformation parameter $\eta'_i$ by which the likelihood of the model sequence selected in step S4 was maximized in the immediately preceding step S3, then, in step S8 the input speech data X is re-recognized using the adapted reference model dictionary and one model sequence of the maximum likelihood is extracted, which is output as the recognition result in step S6. In such an instance, a model sequence of the maximum likelihood function f(X|θ) for the input speech data X transformed into a time sequence of feature parameters is calculated by the Viterbi algorithm and it is output as the recognition result. It is also possible to proceed to the adapted model selecting step S4 after repeating the provisional adaptation step S3 a plurality of times as is the case with the first embodiment of FIG. 2.

Third Embodiment

Figures 6, 7:
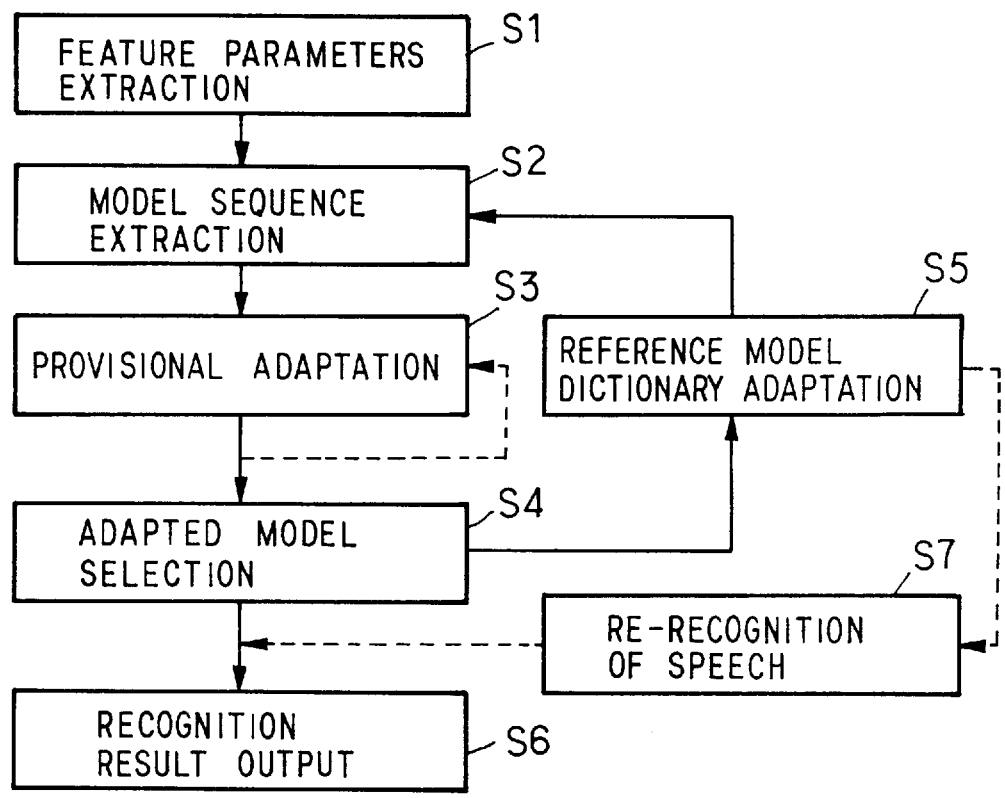
FIG. 6 is a flowchart showing the procedure of the method according to a third embodiment of the present invention.
FIG. 7 is a table showing experimental results that demonstrate the effect of the present invention.

FIG. 6 illustrates the procedure of a third embodiment of the speech model adaptation method according to the present invention. In the second embodiment described above, the N model sequences prior to the provisional adaptation are adapted in step S5 using the transformation parameter $\eta'_i$ by which the likelihood of the model sequence selected in step S4 was maximized in step S3, but in the third embodiment all the models of the reference model dictionary are adapted in step S5, after which the procedure goes back to step S2, not S3, and the processing for selection of the N model sequences of the highest likelihood for the input speech data X is executed again using the dictionary adapted in step S5.

That is, as is the case with the second embodiment of FIG. 2, the model sequence of the likelihood maximized in step S4 is temporarily selected as a correct model sequence from the N provisionally adapted model sequences. In the third embodiment all the models of the reference model dictionary are adapted in step S5 using the transformation parameter $\eta'_i$ which maximized the likelihood of the selected model sequence in step S3, and then the procedure returns to step S2. In step S2 N model sequences of the highest likelihood for the input speech data X are re-selected using the adapted reference model dictionary, followed by the provisional adaptation and the adapted model sequence selection in steps S3 and S4 as in the previous round of processing.

The processing of steps S5, S2, S3 and S4 may be further repeated. Also in such an instance, it is preferable to conduct hierarchial clustering of the model parameters for each round or session of processing to perform the provisional adaptation of the model sequence in step S3 as in the above. In this case, for the adaptation of the reference model dictionary in step S5, model parameters θ of all speech models in the dictionary are clustered into two groups in the same manner as in the clustering of the model parameters in step S3 and the transformation parameters determined for the respective groups in step S3, for example, $\eta_{ia}$ and $\eta_{ib}$, are used for the model parameters of the respective groups independently of each other to thereby perform the adaptation of the dictionary.

In each round of processing of steps S5, S2, S3 and S4, the number of clusters for the model parameters of each model sequence in step S3 is hierarchically increased so that the model parameters of each cluster in the immediately previous processing of step S3 are further clustered into two groups, for instance. Accordingly, in the model adaptation of the third round of processing transformation parameters $\eta_{ia}$, $\eta_{ib}$, $\eta_{ic}$ and $\eta_{id}$ are independently used for the model parameters of the four clusters. Also in the clustering of the model parameters of all the speech models of the dictionary in step S5, the number of clusters is hierarchically increased for each session of the processing to loosen the ties of the speech model parameters accordingly. In the step S4 of the final round of processing that one of the provisionally adapted model sequences obtained in the immediately preceding step S3 which has the maximum likelihood is selected as a correct model sequence. As indicated by the broken lines in FIG. 6, the provisional adaptation in step S3 may be repeated in succession a predetermined number of times with the ties of the transformation parameters loosened each time more than in the immediately previous provisional adaptation.

In the recognition result output step S6, the model sequence of the maximum likelihood selected in step S4 in the final round of processing is output. Alternatively, it is possible to employ a scheme in which the repetitive adaptation processing in steps S2 to S5 is executed a predetermined number of times, then the adaptation of the reference model dictionary in step S5 is performed, then, as indicated by the broken lines in FIG. 6, the input speech data X is re-recognized using the adapted reference model dictionary in step S7 and one model sequence of the maximum likelihood is extracted and output as the recognition result. In this instance, the Viterbi algorithm, for instance, is used to obtain a model sequence of the likelihood function $f(X|\theta)$ for the input speech data transformed into a time sequence of feature parameters, and that model sequence is output as the recognition result in step S6. As is the case with the first embodiment of FIG. 2, the adapted model selection in step S4 may be carried out after the provisional adaptation in step S3 is repeated a plurality of number of times.

In the first, second and third embodiments, the likelihood function $f(X|\Lambda_n,\eta_n,\theta)$ in step S3 may be substituted with a product, $f(X|\Lambda_n,\eta_n,\theta)g(\theta)$, of that function and an a priori probability density function $g(\theta)$. In the above, the speech models are not limited specifically to the HMMS. The extraction of the model sequences in step S2 need not always be done using the N-best paradigm, but the point is to extract the model sequences in which the model sequence of the correct solution is included with a high probability.

In the second and third embodiments N models sequences $\Lambda_1$ to $\Lambda_n$ selected by the N-best paradigm are subjected to provisional adaptation in step S3 and in step S4 that one of them which has the maximum likelihood is selected and the transformation parameter of the selected model sequence is used for the adaptation of other models, but the model sequence of the correct solution does not always have the maximum likelihood. When speaker-independent HMMs are used, if the model sequence of the correct solution is recognized to be lower than 3-best, it is particularly unlikely that the model sequence comes out on top even if provisionally adapted. To avoid this, it is possible to contribute lower-order model sequences to the adaptation in step S5 in view of their reliability as described below, instead of selecting only one model sequence of the maximum likelihood from the N model sequences in step S4.

In this modification, the reliability $C_n$ ($n=1, \ldots, N$) of the N model sequences 1 to N of the highest likelihoods selected in step S2 is defined by the following equation:

$$C_n = \{f(X|\Lambda_n,\theta_n)/f_{max}\}^r$$

where $f_{max}$ is the maximum likelihood of each of the N model sequences $\Lambda_n$ for the input speech data X after their provisional adaptation and $f\{X|\Lambda_n,\theta_n\}$ is the likelihood of each model sequence $\Lambda_n$ after the provisional adaptation, and r is a constant parameter that is experimentally set. This reliability $C_n$ is calculated for each model sequence and the model parameters of the speech HMMs are calculated by the following equation:

$$\theta' = \sum_{n=1}^{N} C_n\theta_n / \sum_{n=1}^{N} C_n$$

The parameter $\theta'$ thus obtained is used to perform the adaptation in step S5. This is called a smooth estimation method.

EFFECT OF THE INVENTION

As described above, according to the present invention, speech of a speaker to be recognized is used to extract a plurality of speaker-independent speech model sequences and the speaker-independent speech models are subjected to adaptation for each sequence. Hence, if a model sequence of a correct solution is included in the extracted model sequences, there is a strong possibility that the likelihood of the model sequence of the correct solution for the input speech data X is maximum among the model sequences adapted in step S3. The present invention adopts adapted speech models of the model sequence of the maximum likelihood, and hence ensures correct adaptation. Assume that the model sequences $\Lambda_1, \ldots, \Lambda_N$ are extracted in descending order of likelihood in step S2. If the likelihood of the model sequence of the correct solution is lower than the maximum likelihood in this case, it is conventional that the speech models of a model sequence of a non-correct solution are subjected to adaptation. In contrast to this, according to the present invention, it is very likely that the adapted speech models of the correct-solution model sequence are maximum in the likelihood for the input speech X—this ensures more correct adaptation of the speech models. It is important, therefore, that the probability of the correct answer being included in the N model sequences extracted in step S2 is high as referred to previously herein.

The effect of the present invention was evaluated by experiments on the recognition of four-digit numbers. The speech HMMs used in the experiment were continuous HMMs with four mixture Gaussian distributions. Thirteen kinds of speech HMMs (/rei/, Imaru/, /zero/, /ichi/, /ni/, /san/, /yon/, /go/, /roku/, /nana/, /hachi/, /kyu/, /ku/, all of which are Japanese words representing numbers 0, 0, 0, 1, 2, 3, 4, 5, 6, 7, 8, 9, 9, respectively, including the same numbers with different pronunciations) were prepared for each number of four-digit numerals. Speaker-independent speech HMMs were produced using a total of 24,194 utterances (isolated numerals or two- or four-digit numerals) by 177 male speakers, and HMM parameters were estimated by a Baum-Welch algorithm. The evaluation was made in terms of a four-digit numeral recognition rate, using for the speaker adaptation and recognition six utterances (four-digit numerals) by each of 100 male speakers different from the speakers for the production of the speaker-independent speech HMMs. Cepstrums and delta cepstrums were extracted, as feature parameters, by subjecting speech data of a sampling frequency 8 kHz to an LPC analysis of a 12-analysis order which was made over a 32-ms frame length every 8-ms frame period.

In the speaker adaptation, only a bias component Δm (i.e., η=Δm) of the mean value m of each mixture Gaussian distribution of the speech HMMs was estimated as in the third embodiment. The total number of biases Am was set initially at 1 (tightly tied) in common to all the distributions of all models, and for each repetition of the adaptation processing is conducted, the number of biases was hierarchically increased (that is, clustering was carried out hierarchically). The number N of N-best hypotheses (the model sequences extracted in step S2) was set at 10.

FIG. 7 shows a recognition rate (baseline) using the speaker-independent speech HMMs, a recognition rate (prior art) using speech HMMs adapted by the conventional adaptation method which performs speaker adaptation of speaker-independent speech HMMs of model sequences obtained by the speech recognition using the speaker-independent speech HMMs, and a recognition rate (present invention) using the speech HMMs adapted by the method of the third embodiment. From FIG. 7 it is evident that this invention method is more effective than the prior art method.

It will be apparent that many modifications and variations may be effected without departing from the scope of the novel concepts of the present invention.

What is claimed is:

1. A speaker adaptation method for speech models whereby speaker-independent speech models, which form a reference model dictionary modeled by model parameters from speech features corresponding to a phoneme, word or similar recognition category in speech of many speakers, are adapted to speech of a speaker to be recognized, said method comprising:

(a) a feature parameter extracting step of extracting a speech feature parameter sequence of input speech of said speaker to be recognized;

(b) a model sequence extracting step of extracting from said reference model dictionary a plurality of hypothetical model sequences estimated to correspond to said feature parameter sequence of said input speech;

(c) a provisional adaptation step of performing provisional adaptation of each of said plurality of extracted hypothetical model sequences by controlling its model parameters in a manner to maximize its likelihood for said feature parameter sequence of said input speech; and (d) an adapted model selecting step of selecting, as an adapted speech model sequence, at least one of said provisionally adapted hypothetical model sequences on the basis of their likelihoods for said feature parameter sequence of said input speech.

2. The method of claim 1, wherein said adapted model selecting step (d) is a step of selecting that one of said hypothetical model sequences provisionally adapted in said provisional adaptation step (c) which has the maximum likelihood for said feature parameter sequence of said input speech.

3. The method of claim 1 or 2, which repeats at least once: a step of adapting said speaker-independent speech models on the basis of model parameters of said adapted speech model sequence selected in said adapted model selecting step (d); a step of performing said provisional adaptation step while finely performing said provisional adaptation of said each extracted hypothetical model sequence with the ties of its transformation parameters loosened more than in the immediately previous provisional adaptation through the use of said adapted speaker-independent speech models; and a step of re-extracting said adapted model sequence in said adapted model selecting step (d).

4. A speech recognition method which follows said method of claim 3 and includes: a reference model dictionary adaptation step of adapting all speech models of said reference model dictionary to said model sequence selected in said adapted model selecting step; and a re-recognition step of extracting from said adapted reference model dictionary a speech model sequence of the maximum likelihood for said feature parameter sequence of said input speech and outputting said extracted speech model as the result of recognition.

5. The speaker adaptation method of claim 4, wherein said re-recognizing step is a step of calculating, by a Viterbi algorithm, a model sequence which has the maximum likelihood function for said input speech data transformed to a time sequence of feature parameters.

6. The method of claim 1 or 2, further comprising: a reference model dictionary adaptation step of adapting speech models of said reference model dictionary to said provisionally adapted model sequence in said adapted model selecting step (d); a step of re-selecting said plurality of hypothetical model sequences of the maximum likelihoods for said input speech through the use of said adapted reference model dictionary in said model sequence extracting step (b) and of performing said provisional adaptation step (c) while finely performing said provisional adaptation of said each extracted hypothetical model sequence with the ties of its transformation parameters loosened more than in the immediately previous provisional adaptation; and a step of selecting, as a re-adapted model sequence, that one of said provisionally adapted hypothetical mode sequences which has the maximum likelihood.

7. A speech recognition method which follows said method of claim 6 and includes a step of re-recognizing said feature parameter sequence of said input speech by the use of speaker-independent speech models of said reference model dictionary adapted finally, extracting one model sequence of the maximum likelihood for said feature parameter sequence, and outputting said extracted model sequence as the result of recognition of said input speech of a speaker to be recognized.

8. A recording medium having recorded thereon the speech recognition method of claim 7.

9. The speaker adaptation method of claim 7, wherein said re-recognizing step is a step of calculating, by a Viterbi algorithm, a model sequence which has the maximum likelihood function for said input speech data transformed to a time sequence of feature parameters.

10. The method of claim 2, further comprising a step of repeating said provisional adaptation step in succession a predetermined number of times for fine provisional adaptation with the ties of said transformation parameters loosened more than in the immediately previous provisional adaptation.

11. The method of claim 2, further comprising a step of repeating said provisional adaptation step in succession a predetermined number of times for fine provisional adaptation with the ties of said transformation parameters loosened more than in the immediately previous provisional adaptation.

12. The method of claim 1 or 2, wherein said model sequence extracting step (b) is a step of obtaining a predetermined number of model sequences which has the maximum likelihood for said feature parameter sequence of said input speech.

13. The method of claim 1 or 2, wherein said adapted model selecting step (d) is a step of selecting said speech models as the sum of adapted speech models corresponding to said extracted model sequences after being provisionally adapted in said provisional adaptation step (c), said adapted speech models being weighted corresponding to their likelihoods for said feature parameter sequence of said input speech.

14. The method of claim 1 or 2, wherein said speech models are speech HMMs defined by statistical parameters.

15. The method of claim 14, wherein said provisional adaptation step (c) is a step of adapting said hypothetical models in a manner to maximize their likelihoods for said feature parameter sequence of said input speech by controlling the mean values of Gaussian distributions which are at least one of said statistical parameters.

16. A speech recognition method which follows said method of claim 1 or 2 and includes a step of outputting, as a result of recognition of said input speech of said speaker to be recognized, a recognition category corresponding to said model sequence selected in said adapted model selecting step (d).

17. A recording medium having recorded thereon the speech recognition method of claim 16.

18. A speech recognition method which follows said method of claim 2 and includes: a reference model dictionary adaptation step of adapting all speech models of said reference model dictionary to said model sequence selected in said adapted model selecting step; and a re-recognition step of extracting from said adapted reference model dictionary a speech model sequence of the maximum likelihood for said feature parameter sequence of said input speech and outputting said extracted speech model as the result of recognition.

19. The speaker adaptation method of claim 18, wherein said re-recognizing step is a step of calculating, by a Viterbi algorithm, a model sequence which has the maximum likelihood function for said input speech data transformed to a time sequence of feature parameters.

20. A recording medium having recorded thereon the speech recognition method of claim 19.

* * * * *